United States Patent
Beelman et al.

(10) Patent No.: US 7,048,956 B2
(45) Date of Patent: May 23, 2006

(54) PROCESS FOR ANTIMICROBIAL TREATMENT OF FRESH PRODUCE, PARTICULARLY MUSHROOMS

(75) Inventors: Robert B. Beelman, State College, PA (US); Ali Demirci, State College, PA (US)

(73) Assignee: The Penn State Research Foundation, University Park, PA (US)

(*) Notice: Subject to any disclaimer, the term of this patent is extended or adjusted under 35 U.S.C. 154(b) by 316 days.

(21) Appl. No.: 10/091,367

(22) Filed: Mar. 5, 2002

(65) Prior Publication Data

US 2003/0170354 A1 Sep. 11, 2003

(51) Int. Cl.
A23B 7/00 (2006.01)

(52) U.S. Cl. .................. 426/268; 426/303; 426/310; 426/335; 426/615; 426/541; 134/42

(58) Field of Classification Search ............. 426/268, 426/303, 310, 336, 615, 541; 422/23, 29; 134/42
See application file for complete search history.

(56) References Cited

U.S. PATENT DOCUMENTS

| | | | |
|---|---|---|---|
| 3,718,482 A | | 2/1973 | Hinkley |
| 4,066,795 A | | 1/1978 | Dave |
| 4,177,294 A | * | 12/1979 | Lehmann et al. ............ 426/271 |
| 4,735,813 A | * | 4/1988 | Spinoglio ................... 426/281 |
| 4,814,192 A | | 3/1989 | Sapers et al. |
| 4,959,483 A | | 9/1990 | Matsumura et al. |
| 5,055,313 A | | 10/1991 | Warren |
| 5,461,446 A | * | 10/1995 | Sakaguchi et al. ............ 134/42 |
| 5,912,034 A | | 6/1999 | Martin et al. |
| 5,928,573 A | | 7/1999 | Spencer et al. |
| 5,939,117 A | | 8/1999 | Chen et al. |
| 5,945,146 A | | 8/1999 | Twinam |
| 5,997,654 A | | 12/1999 | Murch et al. |
| 6,020,018 A | | 2/2000 | Tong et al. |
| 6,033,704 A | | 3/2000 | Talley |
| 6,045,846 A | | 4/2000 | Bautista et al. |
| 6,054,160 A | | 4/2000 | Gawad et al. |
| 6,113,653 A | * | 9/2000 | Ashley et al. ................ 422/23 |
| 6,139,890 A | | 10/2000 | Simpukas |
| 6,200,618 B1 | | 3/2001 | Smith et al. |
| 6,367,488 B1 | | 4/2002 | Murch et al. |
| 6,403,134 B1 | | 6/2002 | Nayyar et al. |
| 6,578,590 B1 | * | 6/2003 | Leblond ................... 134/99.2 |

OTHER PUBLICATIONS

Kim et al., "Roles of Oxidation–Reduction Potential in Electrolyzed Oxidizing and Chemically Modified Water for the inactivation of Food–Related Pathogens," J. Food Prot. 63 19–24.

Koseki et al., "Decontamination of lettuce using acidic electrolyzed water."J. Food Prot. 64:652–658.

* cited by examiner

Primary Examiner—N. Bhat
(74) Attorney, Agent, or Firm—McKee, Voorhees & Sease, P.L.C.

(57) ABSTRACT

Preservative compositions using toxicologically acceptable ingredients, and employing a pH of 9.0 or above for at least part of the process, for reducing the initial population and controlling the growth of spoilage bacteria and human pathogens and for preventing unwanted color changes in fresh and processed produce, particularly mushrooms. Aqueous solutions of preservatives are prepared and applied in multiple stages to the mushrooms, by spraying or immersion. More specifically, disclosed is a method for preserving fresh and processed mushrooms, comprising the steps of: contacting the mushrooms with an antimicrobial solution having a pH of about 9.0 or above; and rinsing the mushrooms one or more times immediately after the contacting step with pH-neutralizing solutions having a pH sufficient to return the produce to its physiological pH. In a preferred embodiment, electrolyzed basic water is used in the first stage high-pH rinse step and electrolyzed acid water is used in the second stage neutralizing solution step. Tyrosinase inhibitors such as ascorbates, erythorbates, EDTA or calcium chloride are added to the neutralizing solutions to inhibit enzymatic browning.

27 Claims, No Drawings

PROCESS FOR ANTIMICROBIAL TREATMENT OF FRESH PRODUCE, PARTICULARLY MUSHROOMS

STATEMENT REGARDING FEDERALLY FUNDED RESEARCH

This invention was made with support from the Government under Hatch Act Project No. PEN03774. The Government has certain rights in this invention.

FIELD OF THE INVENTION

The present invention relates generally to processes for reducing bacterial population and retarding spoilage and other unwanted quality changes in fresh and processed produce, particularly mushrooms, that are intended for ingestion by humans and lower animals, and more specifically to antimicrobial aqueous washes, especially those employing a pH of about 9.0 or above as part of the process, which are especially suitable for practicing said processes.

BACKGROUND OF THE INVENTION

Consumers identify whiteness and cleanliness of fresh mushrooms as the principal factors determining the quality thereof. Consumers prefer to purchase mushrooms that are bright white and free of casing material, compost, or other unwanted particulate contaminants clinging to the surfaces thereof.

Commercial mushroom cultivation practices, typically growing mushrooms in straw-bedded horse manure compost covered with a fine layer of peat or other "casing material," yields mushrooms with unwanted particulate contaminants clinging to the mushroom cap and other surfaces, giving an undesirable appearance. Moreover, mushrooms are typically harvested by hand, introducing a potential source of contamination by human pathogens in addition to the normally present fluorescent pseudomonads and other spoilage organisms that lead to accelerated tissue decay and discoloration.

Mushroom discoloration (browning and purple blotch) occurs when a polyphenol oxidase enzyme (tyrosinase), which naturally occurs at high levels in mushroom cap cuticle (surface) tissue, interacts with phenolic substrates, also naturally occurring in mushroom tissue, to produce the brown pigment melanin. In healthy, intact mushroom tissue, the enzyme and its substrates are located in separate subcellular compartments, and are therefore prevented from reacting to form colored pigments. Unfortunately, mushroom tissue deteriorates with time due to severance and is highly susceptible to damage by bacterial action or by physical handling, and this damage allows the browning enzyme and its substrates to interact, resulting in unwanted color changes in the mushroom tissue.

It would be highly desirable, therefore, to provide a commercial preservative treatment in the form of efficacious processing aids to prevent bacterial damage to mushroom tissue, indirectly preventing discoloration, and to inhibit directly the polyphenol oxidase-mediated browning reaction. Moreover, it would be especially desirable to introduce process aids in the form of a spray or wash that would remove compost, casing material, and other unwanted particulate material clinging to mushroom surfaces.

Prior to 1986, aqueous solutions of sulfite, particularly sodium metabisulfite, were used to wash mushrooms for the purpose of removing unwanted particulate matter, and to enhance mushroom whiteness. In 1986, however, the U.S. FDA banned the application of sulfite compounds to fresh mushrooms, due to severe allergic reactions to sulfites among certain asthmatics.

Following the ban on sulfite compounds for processing of fresh mushrooms, there have been several efforts to develop wash solutions for use as a suitable replacement for sulfites. While sulfite treatment yields mushrooms of excellent initial whiteness and overall quality, it does not inhibit the growth of spoilage bacteria. Therefore, the quality improvement brought about by sulfite use is transitory. After 3 days of refrigerated storage, bacterial decay of sulfited mushrooms becomes evident. Traditionally, this was not a concern to mushroom growers, because sulfite washes were inexpensive, effective at removing unwanted particulates, and gave excellent initial quality.

The banning of sulfite washes, however, gave researchers incentive not only to find a suitable sulfite replacement, but also to improve upon sulfite washes by developing a preservative treatment which would extend washed mushroom shelf life beyond that attainable by sulfiting, and which would improve storage quality over that of sulfited mushrooms. McConnell developed an aqueous preservative wash solution containing 10,000 parts per million (ppm) hydrogen peroxide and 1000 ppm calcium disodium EDTA. The hydrogen peroxide serves as an antimicrobial agent, while EDTA enhances antimicrobial activity and directly interferes with the enzymatic browning reactions. Copper is a functional cofactor of the mushroom browning enzyme, tyrosinase, and tyrosinase activity is dependent upon copper availability. EDTA binds copper more readily than does tyrosinase, thereby sequestering copper and reducing tyrosinase activity and associated discoloration of mushroom tissue.

Hydrogen peroxide acts as a bactericide by causing oxidative damage to DNA and other cellular constituents. Sapers adapted McConnell's hydrogen peroxide treatment, incorporating hydrogen peroxide into a two-stage mushroom wash, employing 10,000 ppm hydrogen peroxide in the first stage and 2.25% or 4.5% sodium erythorbate, 0.2% cysteine-HCL, and 500 ppm or 1000 ppm EDTA in aqueous solution in the second stage. Hydrogen peroxide treatments typically yielded mushrooms nearly as white as sulfited mushrooms initially, and whiteness surpassed that of sulfited mushrooms after 1–2 days of storage at 12° C., and shelf life was dramatically improved. Hydrogen peroxide, however, is not currently approved for treatment of fresh produce. More efficacy and safety data are required. Moreover, as the browning reaction itself is oxidative, it would be advantageous to employ a non-oxidative agent, rather than a strong oxidizer such as hydrogen peroxide, for controlling bacterial growth.

U.S. Pat. No. 5,919,507 to Beelman et al., which is hereby incorporated by reference in its entirety for all purposes, generally discloses a process of treating mushrooms with a first stage high-pH aqueous solution and then rinsing the mushrooms with a second stage neutralizing wash or washes. The neutralizing wash preferably contains a buffered solution of erythorbic acid and sodium erythorbate.

SUMMARY OF THE INVENTION

The present invention provides a sulfite alternative employing high pH wash (preferably a pH of about 9.0 or above) to control bacterial growth on mushrooms followed by an antimicrobial neutralizing wash or washes preferably containing browning inhibitors to minimize enzymatic browning of mushroom tissue. In one embodiment, the antimicrobial neutralizing wash is followed by a separate antioxidant wash containing the browning inhibitors. In a preferred embodiment, electrolyzed basic water is used in the high-pH wash and electrolyzed acidic water is used in the neutralizing wash.

High pH (9.0 or above) has been shown to be effective for controlling the growth of bacteria in egg washwater. The present invention uses high-pH solutions as an antimicrobial wash treatment for fresh produce, particularly mushrooms, to prevent bacterial decay of produce tissue and resultant tissue browning. With their high susceptibility to tissue damage, mushrooms represent a unique application of high-pH preservative treatments. Solution exposure time must be carefully controlled, to optimize bacterial destruction while avoiding counterproductive overexposure of mushrooms to extremes of pH, resulting in chemical damage to tissue. Thus, the present invention comprises a multiple-stage wash procedure, with an initial high-pH antimicrobial step, followed by a second antimicrobial neutralizing step utilizing one or more pH neutralization and/or browning inhibitor washes.

The present invention provides a high-pH treatment for the control of bacterial spoilage of mushrooms. A first-stage, high-pH wash destroys bacteria, but might also directly damage mushroom tissue. This is avoided, however, if mushroom exposure time to the high-pH solution is brief and is followed in rapid succession by a second-stage neutralizing buffer solution.

A principal objective of the present invention is to provide a practical wash treatment that will yield mushrooms as white as sulfite-treated mushrooms initially, while reducing bacterial populations and also suppressing bacterial growth, extending shelf life, and improving storage quality.

It is a principal object of the present invention to apply high pH bactericidal solutions to mushrooms followed by neutralization of mushroom pH and introduction of browning inhibitors, to prevent bacterial decay and mushroom tissue discoloration.

Further, it is an object of this invention to accomplish the above-noted objectives in as cost efficient manner as possible using compositions and wash solutions having regulatory approval to be used as process aids for treatment of fresh produce.

In general, the foregoing objectives are accomplished by providing a process for a high pH wash treatment wherein the mushrooms are contacted first with a highly basic aqueous solution followed by rinsing with a neutralizing solution wash or washes. In a preferred embodiment the first stage basic solution comprises electrolyzed basic water and the second stage antimicrobial neutralizing solution comprises electrolyzed acidic water. In another preferred embodiment, the second stage neutralizing solution comprises fumaric acid and sodium benzoate. Optionally, a third stage antioxidant neutralizing solution wash may be advantageously employed comprising browning inhibitors such as ascorbate, erythorbate, EDTA and/or calcium chloride, particularly when the second stage neutralizing solution does not contain or contains minimal browning inhibitors.

Preservative compositions using toxicologically acceptable ingredients, and employing a pH of 9.0 or above for at least part of the process, for reducing the initial population and controlling the growth of spoilage bacteria and human pathogens and for preventing unwanted color changes in fresh and processed produce, particularly mushrooms. Aqueous solutions of preservatives are prepared and applied in multiple stages to the mushrooms, by spraying or immersion. More specifically, disclosed is a method for preserving fresh and processed mushrooms, comprising the steps of: contacting the mushrooms with an antimicrobial solution having a pH of about 9.0 or above; and rinsing the mushrooms one or more times immediately after the contacting step with pH-neutralizing solutions having a pH sufficient to return the produce to its physiological pH. In a preferred embodiment, electrolyzed basic water is used in the first stage high-pH rinse step and electrolyzed acid water is used in the second stage neutralizing solution step. Tyronase inhibitors such as ascorbates, erythorbates, EDTA or calcium chloride are added to the neutralizing solutions to inhibit enzymatic browning.

DETAILED DESCRIPTION OF THE PREFERRED EMBODIMENTS

The wash treatments of the present invention consist of two stages: a first-stage, high-pH antimicrobial wash (a pH of 9.0–11.8), followed by a second-stage neutralization wash or washes. Typically, the antimicrobial wash comprises a basic sodium or potassium carbonate or bicarbonate aqueous solution. The first stage wash is followed in rapid succession by a neutralizing wash or washes to return the surface pH of the mushrooms to the physiological pH of mushrooms. Preferably, the neutralization wash comprises browning inhibitors such as ascorbate, erythorbate, calcium chloride, and EDTA.

Any suitable high-pH aqueous solution having sufficiently bactericide effect may be used as the first stage high-pH wash. Examples of two chemically modified solutions prepared at pH 11.0, a suggested pH for useful antimicrobial action, are as follows: a 0.05M sodium bicarbonate solution (pH 8.25) adjusted to pH 11.0 with 1.0N sodium hydroxide, and a 1% tribasic sodium phosphate solution (pH 11.74) adjusted to pH 11.0 with 42.5% phosphoric acid. Sodium or potassium carbonate or bicarbonate buffer solutions having a pH in the range of about 9 to 11.8 are preferred.

It has also been found that basic solutions of electrolyzed water may be advantageously used in the first stage high-pH wash. Electrolyzed water is typically produced using pure water with no added chemicals except sodium chloride (NaCl). Commercial electrolyzed water generators are available, for example, from Amano Corporation of Yokohama, Japan, Aiken Industrial Co., Ltd. of Japan or Hoshizaki Electric Co. Ltd. of Aichi, Japan. The generation of electrolyzed water involves reactions in a cell containing inert positively-charged and negatively-charged electrodes separated by a membrane through which a very dilute salt water solution passes. Two types of water are generated: electrolyzed basic water (aqueous solutions having a pH of about 11.4 and a low oxidation-reduction potential (ORP), i.e., a reducing potential that leads to the reduction of free radicals in biological systems, typically lower than −700 mV) and electrolyzed acidic water (aqueous solutions having a pH 2.2 to 3.0 and a high ORP, typically greater than +1100 mV, with residual free chlorine of 10 to 80 ppm).

Electrolyzed basic water may be used as the first stage high-pH solution either alone or chemically modified. The electrolyzed basic water may be buffered with, for example, a suitable acid such as hydrochloric, citric or fumaric acid.

Since high pH is employed as the principal antimicrobial factor, it is necessary to neutralize pH in the second wash stage, to minimize produce tissue damage and resultant acceleration of enzymatic browning.

As previously taught in U.S. Pat. No. 5,919,507, the neutralizing solutions used in the neutralizing wash may comprise a variety of aqueous solutions including a simple water wash. The important factor is that the pH on the surface of the produce or mushrooms be returned to its physiological pH (in the case of mushrooms, about 6.5) as rapidly as possible in order to minimize enzymatic browning.

Neutralizing solutions may include food grade acidulants such as erythorbic acid, ascorbic acid, fumaric acid, and citric acid, as well as acetic acid, phosphoric acid, malic acid, lactic acid, gluconic acid, hydrochloric acid, sulfuric acid or the like and combinations thereof. Preferably, the acidulants are present in a buffered solution. From a commercial standpoint, citric acid, fumaric acid, benzoic acid and combinations thereof are particularly useful acidulants due to the relative lower cost, ease of handling, and enzymatic browning inhibiting properties and approval for use on edible products. In general, the acidulant will maintain the neutralizing solution pH in the range of 2 to 5.5, preferably a pH of 3 to 5 and will comprise between 0.1 to 3 percent by weight, preferably 0.5 to 1.0 percent by weight of the neutralizing solution. The neutralizing solutions are preferably formulated in accordance with the present invention to impart antimicrobial activity as well as pH-neutralizing properties.

The wash solutions may also comprise ozonated water having an ozone concentration of 1–20 ppm, preferably 5 ppm or greater. The ozonated water wash may be employed in conjunction with an initial high pH wash or separately without such high pH wash. Preferably the ozonated water wash is followed by an antioxidant wash using a solution containing browning inhibitors. Alternatively, browning inhibitors may be incorporated in the ozonated water solution in, for example, the concentrations noted elsewhere herein.

Preferably, the neutralizing solution also comprises browning inhibitors to further inhibit enzymatic browning. Any suitable known browning inhibitor may be used such as ascorbates and erythorbates, preferably in the range of 1 to 4 percent by weight of the neutralizing solution. Other known browning inhibitors include EDTA, calcium chloride and the like. The preferred range of EDTA is 0.01 to 0.3 percent by weight and the preferred range of calcium chloride is 0.01 to 2, more preferably 0.05 to 0.15, percent by weight of the neutralizing solution.

It has been found that a pH-neutralizing solution comprising fumaric acid and sodium benzoate (or associated acid) has particularly effective antimicrobial properties when used in the present invention. Preferably, the fumaric acid/benzoate combination is present in the range of 0.1 to 3 percent by weight of the solution.

Preferably, where chlorine is present, the available chlorine concentration in the pH-neutralizing solution is in the range of 5–200 ppm $Cl_2$ and/or 1–50 ppm $ClO_2$. The addition of stabilized chlorine dioxide in Stage II or Stage III neutralizing washes beneficially inhibits the build up of bacteria on the produce that may otherwise occur, thereby providing a longer shelf life for the produce. The antimicrobial properties of the wash are enhanced when stabilized chlorine dioxide is employed in a neutralizing wash having an acidic pH and/or in a neutralizing wash at neutral pH where free chlorine is also present. It has also been found that the addition of benzoic acid in the Stage II or Stage III neutralizing washes also advantageously inhibits bacteria build up on the produce.

Electrolyzed acidic water may be used as the neutralizing solution in the second stage. Preferably, browning inhibitors such as ascorbates, erythorbates, EDTA and calcium chloride are added to the solution. In a preferred embodiment, electrolyzed acidic water is buffered with an erythorbate salt such as sodium erythorbate, preferably in the range of 0.2 to 4 percent by weight of the neutralizing solution. Optionally, acidulants such as those noted above may also be used in combination with electrolyzed acidic water.

The use of electrolyzed basic water and electrolyzed acidic water in the present invention provides several advantages. Electrolyzed water can be produced on site relatively inexpensively using commercially available generators. The production of electrolyzed water is relatively simple and does not require extensive handling and maintaining of chemicals such as concentrated acids. Further, when both the basic and acidic solutions are used in the process, the residual washes can be disposed of in an environmentally sound manner, i.e., the electrolyzed basic water and electrolyzed acidic water can be combined to produce a neutral aqueous solution that can be discharged without any harm to the environment or special wastewater processing.

The two stage treatment process described herein may be applied to mushrooms or other produce by either dipping or spraying the required solutions and thus the process is feasible for continuous operation. The second stage neutralizing wash may be accomplished in a single wash or multiple washes.

Optionally, a third stage pH-neutralizing/browning inhibitor wash may be used. In this embodiment, the solutions of the third stage wash comprise browning inhibitors such as ascorbate, erythorbate, EDTA and calcium chloride. The use of a third stage wash is particularly advantageous where the second stage neutralizing solution does not comprise any browning inhibitors or comprises only minimal anti-browning agents. When browning inhibitors are present in the second stage solution, the third stage wash may serve to enhance the anti-browning effect of the overall wash process.

The following examples are included herein to illustrate preferred embodiments of this invention.

EXAMPLE 1

A first stage solution is prepared using deionized water, 0.42 percent weight sodium bicarbonate and sodium hydroxide to adjust the solution pH to 10.5 at 25° C. A neutralization stage aqueous solution is prepared containing 0.15 weight percent fumaric acid and 0.15 weight percent sodium benzoate having a pH of 3.5. The neutralization stage solution is chilled to 10° C. Mushrooms are washed in 3.5-liter polyethylene buckets, at a ratio of 300 g of mushrooms per liter of wash solution. The mushrooms are washed for 30–60 seconds in the first stage solution and then immediately transferred to the second stage neutralization solution and immersed for an additional 30 seconds, for a total wash time of 90 seconds. In both wash stages, mushrooms are gently agitated by hand.

EXAMPLES 2–6

The same procedure as set forth in Example 1 is followed, using the following formulations for first and second stage solutions. All solutions are described as weight percent of each component except where indicated.

| Example | Stage I High-pH Sol'n | Stage II Neutralizing Sol'n |
|---|---|---|
| 2 | Sodium bicarbonate 0.42% Sodium hydroxide to adjust pH to 10.5 | Sodium Erythorbate 2.0% Citric Acid 0.4% EDTA 0.1% Calcium Chloride 0.1% pH = 4.3 |
| 3 | Sodium bicarbonate 0.42% Sodium hydroxide to adjust pH to 10.5 | Sodium Erythorbate 2.0% Fumaric Acid 0.3% EDTA 0.1% Calcium Chloride 0.1% pH = 4.2 |
| 4 | Electrolyzed basic water (pH 11.4, ORP −795 mV) Adjusted to pH 10.5 with fumaric acid | Electrolyzed acidic water (pH 2.3, ORP +1150) Sodium Erythorbate 2.0% pH = 4.5 |
| 5 | Electrolyzed basic water (pH 11.4, ORP −795 mV) Adjusted to pH 10.5 with fumaric acid | Sodium Erythorbate 2.0% Fumaric Acid 0.3% EDTA 0.1% Calcium Chloride 0.1% pH = 4.2 |
| 6 | Sodium bicarbonate 0.42% Sodium hydroxide to adjust pH to 10.5 | Electrolyzed acidic water (pH 2.3, ORP +1150) Sodium Erythorbate 2.0% pH = 4.5 |
| 7 | Sodium bicarbonate 0.42% Sodium hydroxide to adjust pH to 10.5 | Sodium Erythorbate, 1.6% Erythorbic Acid 0.4% Chlorine dioxide 5 ppm pH 5.0 |

EXAMPLES 8–14

The procedure as set forth in Example 1 is employed with the rinse times as indicated, using the following formulations for first and second stage solutions. Additionally, the mushrooms are washed in a third stage neutralizing solution containing browning control agents followed by a water spray rinse. All solutions are described as weight percent of each component except where indicated.

| Example | Stage I High-pH Antimicrobial Sol'n 15–45 sec. (60–100° F.) | Stage II Low-pH Antimicrobial & Neutralizing Sol'n 15–45 sec. (50–90° F.) | Stage III Low-pH Neutralizing & Browning Control Sol'n 15–45 sec. (40–80° F.) | Stage IV Water Rinse 5–15 sec. (spray @40–70° F.) |
|---|---|---|---|---|
| 8 | Sodium bicarbonate 0.42% Sodium hydroxide to adjust pH to 10.5 | Fumaric acid, 0.3% Sodium benzoate, 0.3% pH 3.5 | Sodium Erythorbate, 1.6% Erythorbic Acid 0.4% EDTA, 0.1% Calcium Chloride, 0.1% pH 5.0 | Water |
| 9 | Electrolyzed basic water (pH 11.4, ORP −795 mV) | Electrolyzed acidic water (pH 2.7, ORP +1150 mV) | Sodium Erythorbate, 2.4% Erythorbic acid, 0.6% EDTA, 0.1% Calcium Chloride, 0.1% pH 5.2 | Water |
| 10 | Electrolyzed basic water (pH 11.4, ORP −795 mV) | Fumaric acid, 0.3% Sodium benzoate, 0.15% pH 3.5 | Sodium Erythorbate, 1.0–3.0% EDTA, 0.1% Calcium Chloride, 0.1% pH 4.8 | Water |
| 11 | Sodium bicarbonate 0.42% Sodium hydroxide to adjust pH to 10.5 | Citric acid, 0.3–1.0% Adjust to pH 5.5 with NaOH +50 ppm $Cl_2$ +5 ppm $ClO_2$ (stabilized) | Sodium Erythorbate, 1–3% Erythorbic acid, 0.2–0.6% EDTA, 0.1% Calcium Chloride, 0.1% pH 5.2 | Water |
| 12 | Sodium bicarbonate 0.42% Sodium hydroxide to adjust pH to 10.5 | Ozonated water (ORP +1,256 mV) Citric acid buffered to pH 4.5 | Sodium Erythorbate, 1–3% Erythorbic acid, 0.2–0.6% EDTA, 0.1% Calcium Chloride, 0.1% pH 5.2 | Water |
| 13 | — | Ozonated water (ORP +1,256 mV) | Sodium Erythorbate, 1–3% Erythorbic acid, 0.2–0.6% EDTA, 0.1% Calcium Chloride, 0.1% pH 5.2 | Water |

-continued

| Example | Stage I High-pH Antimicrobial Sol'n 15–45 sec. (60–100° F.) | Stage II Low-pH Antimicrobial & Neutralizing Sol'n 15–45 sec. (50–90° F.) | Stage III Low-pH Neutralizing & Browning Control Sol'n 15–45 sec. (40–80° F.) | Stage IV Water Rinse 5–15 sec. (spray @40–70° F.) |
|---|---|---|---|---|
| 14 | Sodium bicarbonate 0.42% Sodium hydroxide to adjust pH to 10.5 | Fumaric acid, 0.3% Sodium benzoate, 0.15% pH 3.5 | Sodium Erythorbate, 1–3% Erythorbic acid, 0.2–0.6% Chlorine dioxide 5 ppm (stabilized) pH 5.2 | Water |

The process of the present invention is particularly useful in the antimicrobial treatment of mushrooms. It can also be advantageously employed in connection with other produce products such as fresh fruits and vegetables and, in particular, produce susceptible to enzymatic browning.

What is claimed is:

1. A process for preserving fresh and processed mushrooms, comprising the steps of:
   (a) contacting the mushrooms with a first antimicrobial solution comprising electrolyzed basic water having a pH of at least about 9.0;
   (b) rinsing the mushrooms after said antimicrobial contacting step with a pH-neutralizing solution having a pH sufficient to return the mushrooms to the mushroom physiological pH of about 6.5,
   wherein the neutralizing solution comprises an acidulant selected from the group consisting of ascorbic acid, erythorbic acid, citric acid, fumaric acid and combinations thereof.

2. The process of claim 1, wherein the neutralizing solution comprises the acidulant in the range of 0.1 to 3 percent by weight and the pH of the neutralizing solution is in the range of 2 to 5.5.

3. The process of claim 1, wherein the neutralizing solution comprises a browning inhibitor.

4. The process of claim 3, wherein the browning inhibitor is selected from the group consisting of ascorbate, erythorbate, EDTA and calcium chloride.

5. The process of claim 3, wherein the neutralizing solution comprises the browning inhibitor in the range of 1 to 4 percent by weight and the browning inhibitor is selected from the group consisting of ascorbate, erythorbate and a combination thereof.

6. The process of claim 1, wherein the neutralizing solution comprises electrolyzed acidic water.

7. The process of claim 1, wherein the acidulant is fumaric acid and the neutralizing solution further comprises sodium benzoate or benzoic acid.

8. The process of claim 1, said process further comprising the step of:
   (c) rinsing the mushrooms with a second pH-neutralizing solution comprising a browning inhibitor.

9. The process of claim 8, wherein the browning inhibitor is selected from the group consisting of ascorbate, erythorbate, EDTA and calcium chloride.

10. A process for preserving a fresh produce product, comprising the steps of:
    (a) contacting the fresh produce product with a first antimicrobial solution comprising electrolyzed basic water having a pH of at least about 9.0;
    (b) rinsing the fresh produce products after said antimicrobial contacting step with a pH-neutralizing solution having a pH sufficient to return the surface pH of the fresh produce product to the physiological pH of the fresh produce product,
    wherein the neutralizing solution comprises electrolyzed acidic water.

11. The process of claim 10, wherein the neutralizing solution comprises a browning inhibitor.

12. The process of claim 11, wherein the browning inhibitor is selected from the group consisting of ascorbate, erythorbate, EDTA and calcium chloride.

13. The process of claim 11, wherein the neutralizing solution comprises the browning inhibitor in the range of 1 to 4 percent by weight and the browning inhibitor is selected from the group consisting of ascorbate, erythorbate and a combination thereof.

14. The process of claim 10, wherein the neutralizing solution comprises an acidulant selected from the group consisting of ascorbic acid, erythorbic acid, citric acid, fumaric acid and combinations thereof.

15. The process of claim 14, wherein the neutralizing solution comprises the acidulant in the range of 0.1 to 3 percent by weight and the pH of the neutralizing solution is in the range of 2 to 5.5.

16. The process of claim 14, wherein the neutralizing solution comprises a browning inhibitor.

17. The process of claim 16, wherein the browning inhibitor is selected from the group consisting of ascorbate, erythorbate, EDTA and calcium chloride.

18. The process of claim 16, wherein the neutralizing solution comprises the browning inhibitor in the range of 1 to 4 percent by weight and the browning inhibitor is selected from the group consisting of ascorbate, erythorbate and a combination thereof.

19. The process of claim 10, wherein the neutralizing solution further comprises fumaric acid and sodium benzoate.

20. The process of claim 10, said process further comprising the step of:
    (c) rinsing the fresh produce product with a second pH-neutralizing solution comprising a browning inhibitor.

21. The process of claim 20, wherein the browning inhibitor is selected from the group consisting of ascorbate, erythorbate, EDTA and calcium chloride.

22. A process for preserving a fresh produce product, comprising the steps of:
    (a) contacting the fresh produce product with a first antimicrobial solution having a pH of at least about 9.0;
    (b) rinsing the fresh produce products after said antimicrobial contacting step with a pH-neutralizing solution comprising electrolyzed acidic water having a pH sufficient to return the surface pH of the fresh produce product to the physiological pH of the fresh produce product,
wherein the neutralizing solution comprises a browning inhibitor.

23. The process of claim 22, wherein the browning inhibitor is selected from the group consisting of ascorbate, erythorbate, EDTA and calcium chloride.

24. The process of claim 22, wherein the neutralizing solution comprises the browning inhibitor in the range of 1 to 4 percent by weight and the browning inhibitor is selected from the group consisting of ascorbate, erythorbate and a combination thereof.

25. The process of claim 22, said process further comprising the step of:
(c) rinsing the mushrooms with a second pH-neutralizing solution comprising a browning inhibitor.

26. The process of claim 25, wherein the browning inhibitor is selected from the group consisting of ascorbate, erythorbate, EDTA and calcium chloride.

27. A process for preserving fresh and processed mushrooms, comprising the steps of:
(a) contacting the mushrooms with a first microbial solution having a pH of at least about 9.0; and
(b) rinsing the mushrooms after said antimicrobial contacting step with a pH-neutralizing solution having a pH sufficient to return the mushrooms to the mushroom physiological oH of about 6.5 comprising an acidulent selected from the group consisting of citric acid, fumaric acid, benzoic acid and combinations thereof; and
wherein the neutralizing solution comprises electrolyzed acidic water.

* * * * *